Aug. 29, 1950 — C. F. PONTY — 2,520,221
JOINT
Filed Dec. 6, 1946
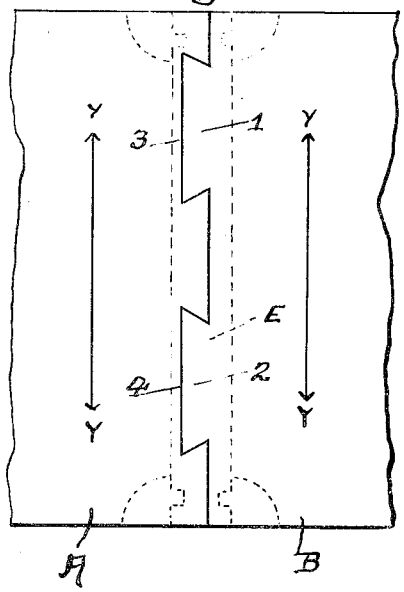
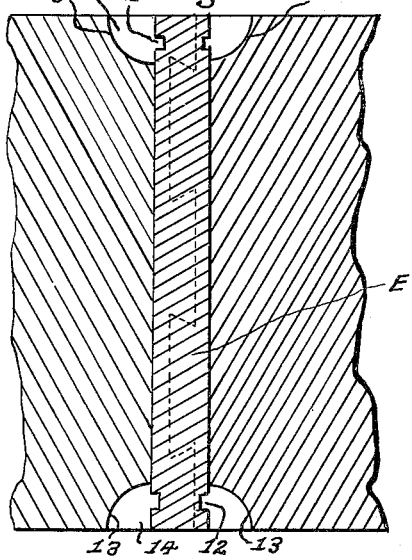
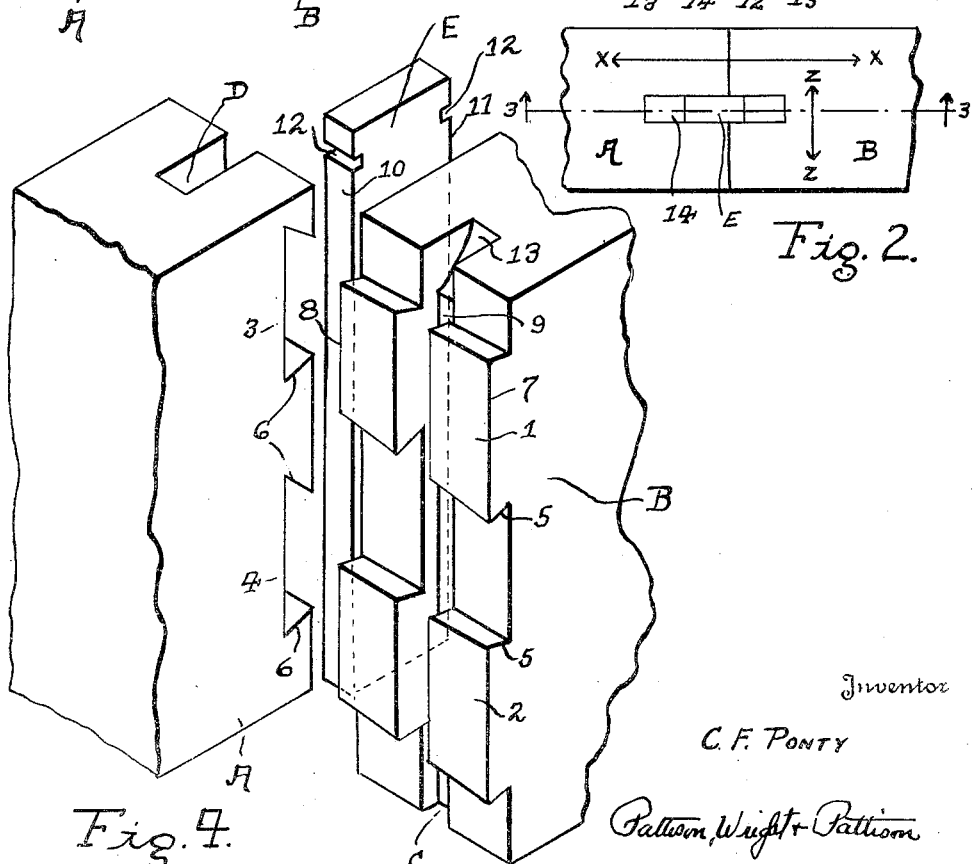
Inventor
C. F. Ponty
Pattison, Wright & Pattison
Attorneys

Patented Aug. 29, 1950

2,520,221

UNITED STATES PATENT OFFICE 2,520,221

JOINT

Carleton F. Ponty, Durham, N. C.

Application December 6, 1946, Serial No. 714,546

1 Claim. (Cl. 20—92)

This invention pertains to joints and the inventive concept is capable of wide usage. The joint can be utilized to connect the edges of all kinds of materials, regardless of the size, the shape, or other variables of the material, together rigidly without the use of nails, bolts, screws, or their equivalents.

The primary object of the invention is the provision of an improved splined dovetail joint so constructed that the joint is extremely strong and is locked against separation in all directions.

Another object of the invention is the provision of a dovetail joint in which a spline is provided to lock the joint against separation in one direction and serves the dual purpose of strengthening the joint and rendering it weatherproof.

Another and further object of the invention is the provision of a splined dovetail joint in which novel and convenient means is provided for removing the spline from the joint when desired.

Other objects, novel features of construction and improved results of the invention will appear in and be understood from the following description when read in the light of the accompanying drawings.

In the drawings:

Fig. 1 is a side view of the joint.

Fig. 2 is a top plan view of the joint.

Fig. 3 is a vertical sectional view on the line 3—3 of Fig. 2.

Fig. 4 is a perspective view of the joint and spline its parts being in separated relationship.

The primary purpose of the invention is the provision of means for interconnecting two members or elements, without the use of nails, screws, bolts, adhesives or the like, in a manner such that the connection is strong and substantially unbreakable in all directions and in the accompanying drawings the inventive concept is illustrated as it would be used in connecting the ends of a pair of planks or boards but it is to be understood that the drawings are merely illustrative and do not limit the invention to this specific use. It is to be further understood that the number of tongues and grooves and their dimensions as well as the dimensions of the spline can be varied without departure from the invention as these would differ in accordance with the needs and desires of the connection to be made.

Having reference now to the drawings A and B are the ends respectively of a pair of planks the ends of which are connected by the present improved joint. These plank ends are connected by a dovetail joint which in this instance comprises a pair of tongues 1 and 2 on the end of plank B which are interlocked with the grooves 3 and 4 in the end of the plank A. The tongues are undercut or beveled at their sides as at 5 and the grooves are similarly undercut or beveled at their opposite sides as at 6. To facilitate the sliding interconnection of the tongues and grooves the grooves are wide at one end and taper toward their other ends and the tongues are wide at their ends 7 and taper toward their narrow ends 8.

As thus far described it will be understood that a connection between the plank ends can be made by sliding the tongues of the plank B into the grooves of the plank A and that the resulting joint is locked against disconnection in respect to stress or strain exerted either longitudinally of the planks, that is in direction of the arrows X—X in Fig. 3, or vertically transverse the planks in the direction of the arrows Y—Y in Fig. 1. A further locking of the joint as well as the weatherproofing thereof will now be described.

Each of the plank ends is provided with a slot which runs completely across the width of the plank and is preferably of an angular shape in cross sectional configuration. This slot is designated C in plank B and D in plank A and it will be seen that the slots have a depth such that their rear walls 9 are a considerable distance inwardly beyond the inner ends of the tongues of the plank B and the bottoms or back walls of the grooves of the plank A. These slots therefore cut through the tongues and grooves respectively of the planks and terminate well within the ends of the planks. A spline E of rectangular shape and of the proper dimensions is slidably received by the slots C and D, when the planks are in dovetail interconnection, and it will be seen that the splines lock the joint against movement and this connection in respect to stresses or strains exerted in a direction transverse the width of the planks, that is in the direction of the arrows Z—Z in Fig. 2. Additionally because of the engagement of the spline with the solid ends of the planks the joint is strengthened and the spline will act as a wind and water stop thus making the joints substantially weatherproof.

Many buildings today are prefabricated and the present joint is particularly suited for interconnecting parts making up a prefabricated building. In such usage the convenient provision for making and breaking a joint is provided but this provision will be found advantageous when the joint is used in other than prefabricated structures. To provide for easy and quick disconnection of the joint the end walls 10 and 11 of the spline adjacent the upper end thereof are provided with oppositely disposed channelways 12 suitable for the reception of the ends of tongs or other suitable instruments for clamping or engaging the spline. To provide for the insertion of the tongs or other instruments the upper ends of the slots C and D are cut back, as at 13, to provide in the upper ends of the planks an open ended chamber 14 within which the upper channelled end of the spline is disposed.

From the foregoing it will be seen that a strong weatherproof joint is provided without the use of nails, or their equivalent, and that the joint can be quickly made or broken at will and that the joint is applicable and suitable for wide usage and that specific departure therefrom can be made without departing from the spirit of the inventive concept. Accordingly the invention is to be limited only within the scope in the hereinafter following claim.

I claim:

In a joint, a pair of elements having abutting edges detachably secured together, said element edges each provided with a plurality of mortises and tenons interlocked to provide a dovetailed interconnection, each element edge provided with a longitudinally extending slot having an open side at the front face of its tenons and extending completely through the tenons and through the bottoms of its mortises and into the element and terminating in a closed side in the element at a point behind the mortises and tenons, the open sides of said slots being in alignment when the mortises and tenons of the elements are interlocked, said slots having open ends, a spline extending throughout the length of the slots and substantially completely filling them, one end of the spline provided with indentations adapted to be engaged by a spline removing tool, and those ends of the slots adjacent the indented end of the spline being enlarged to form a chamber for the reception and accommodation of a spline removing tool.

CARLETON F. PONTY.

REFERENCES CITED

The following references are of record in the file of this patent:

UNITED STATES PATENTS

| Number | Name | Date |
| --- | --- | --- |
| 1,625,612 | Jensen | Apr. 19, 1927 |

FOREIGN PATENTS

| Number | Country | Date |
| --- | --- | --- |
| 275,107 | Great Britain | Aug. 4, 1927 |
| 686,687 | France | 1930 |